United States Patent [19]

Petri

[11] Patent Number: 4,900,803

[45] Date of Patent: Feb. 13, 1990

[54] BRANCHED POLYCARBONATE FROM TRI- OR TETRA-HYDROXY BIPHENYL COMPOUNDS

[75] Inventor: Alberto Petri, Milan, Italy

[73] Assignee: Enichem Tecnoresine S.p.A., Palermo, Italy

[21] Appl. No.: 203,705

[22] Filed: Jun. 7, 1988

[30] Foreign Application Priority Data

Jun. 17, 1987 [IT] Italy .............................. 20928 A/87

[51] Int. Cl.$^4$ .............................................. C08G 63/62
[52] U.S. Cl. ................................... 528/204; 528/196; 528/198

[58] Field of Search ................................. 528/204, 196

[56] References Cited

U.S. PATENT DOCUMENTS 4,755,586  7/1988  Shannon et al. .................... 528/204

Primary Examiner—Harold D. Anderson
Attorney, Agent, or Firm—Hedman, Gibson, Costigan & Hoare

[57] ABSTRACT

Branched, thermoplastic polycarbonates, suitable for being processed according to the blow-molding technique, are prepared by copolymerization with tri- or tetra-hydroxy biphenyl compounds.

3 Claims, No Drawings

BRANCHED POLYCARBONATE FROM TRI- OR TETRA-HYDROXY BIPHENYL COMPOUNDS

The present invention relates to branched, thermoplastic carbonates, suitable for fabrication by blow-molding (blow molding of hollow bodies).

Linear polycarbonates have been long known in the art.

Such polymers are largely used in many application sectors but, contrarily to most thermoplastic polymers, they are not suitable for being processed by extrusion or by the blow-molding technique, which are the suitable techniques for supplying particular fabricated products (alveolar sheets, bottles, hollow containers, and so forth).

This difficulty of processability of linear polycarbonate is due to its exclusively Newtonian behaviour, according to which the apparent viscosisty ($\eta$) is substantially independent from the shear rate ($\dot{\gamma}$).

On the contrary, the fabrication of a material according to the extrusion or blow-molding techniques requires that it has a decreasing apparent viscosity with increasing shear rates, a typical feature of non-Newtonian behaviour, so as to be able to distinguish between two successive statuses of the molten polymer: a first status, when the polymer is inside the processing machine (e.g., an extruder), and the other one when the product exits it (e.g., through the die of the same extruder).

During the first step, the shear rates the fluid is submitted to are high and its apparent viscosity is low, so that the processability of said molten polymer results easier; when the polymer leaves the extruder, on the contrary, low values of $\dot{\gamma}$ and high viscosity values are obtained, which prevent the product from collapsing, and enable the manufactured item to show a good dimensional stability.

The non-Newtonian behaviour of the molten polymer has a considerable influence on two properties thereof, viz., the melt elasticity and the melt strength, which too are very important for the purposes of the extrusion and blow-molding processing techniques.

The melt elasticity substantially consists in the capability shown by a non-Newtonian fluid, of swelling, when exiting a die, to a greater extent than a Newtonian fluid, as a consequence of a higher recovery of elastic energy inside the interior of its mass, thanks to a greater molecular distorsion and orientation under the action of a shear stress.

All the above phenomena result in an increase in product processability, owing to a higher flexibility and ductility of the material.

Vice-versa, the second above-indicated property, the melt strength, becomes meaningful when the molten material exits the fabrication machine. Said melt strength can be regarded as the tenacity of the polymer in the molten state, i.e., the capability exhibited by this latter to withstand stresses.

If, in fact, the molten mass does not succeed in supporting its own weight, the extrudate collapses and, as a consequence, the desired shapes cannot be obtained in the manufactured articles.

It results evident from the above that the polymers with a non-Newtonian behaviour have two basic characteristics, which make them suitable for being fabricated by extrusion and/or blow-molding: a great easiness of machine-processing (a low apparent viscosity for high values of $\dot{\gamma}$ and a high melt elasticity) and a very good dimensional stability when leaving the machine (a high melt viscosity for low values of $\dot{\gamma}$ and a considerably high melt strength).

From the prior art, branched polycarbonates are known, which are endowed with non-Newtonian rheologic properties, and are suitable for being fabricated by extrusion and blow-molding.

Such polycarbonates can be obtained by copolymerization with polyfunctional comonomers containing three or more —OH and/or —COOH and/or —COCl groups.

The main technical problems to be coped with when branched polycarbonates are prepared, essentially consist in the reactivity of the polyfunctional comonomer used and in the characteristics of the branched polycarbonate obtained when such a comonomer is used.

In particular, the comonomer should have a so high reactivity, as to make it possible the desired branching level to be reached (such as to give the polymer a shear sensitivity higher than 15), when small amounts thereof are used.

The branched polycarbonate, besides having a shear sensitivity higher than 15, should maintain unchanged the other properties typical for linear polycarbonates.

The polyfunctional comonomers known from the prior art have not been at all satisfactory from all these viewpoints.

The present Applicant has found now that the drawbacks deriving from the prior art can be overcome and branched thermoplastic polycarbonates, which are suitable for being fabricated by blow-molding, can be obtained by copolymerization with a polyfunctional, highly reactive comonomer, used in small amounts.

Such polycarbonates, thanks to the branchings due to the presence of the polyfunctional comonomer in their macromolecule, show a shear sensitivity (which is the ratio between the melt flow rate values at two different shear rates) of more than 15, with the other characteristics typical for linear polycarbonates being maintained.

Therefore, a purpose of the present invention are branched, thermoplastic polycarbonates suitable for fabrication by blow-moulding.

A purpose of the present invention is also a process for preparing said polycarbonates.

In particular, according to the present invention, such branched polycarbonates are characterized in that they have in their macromolecule, units deriving from tri- or tetra-hydroxy biphenyl compounds having the formula:

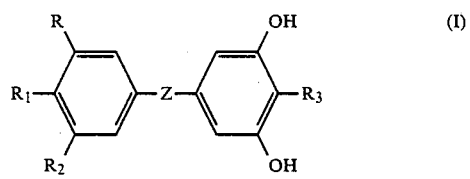

wherein:
Z=O, —CH$_2$—;
R, R$_1$, R$_2$, either equal to, or different from, one another, mean H, OH or CH$_3$, and at least one thereof is OH;
R$_3$=H, CH$_3$.

The branched polycarbonates disclosed in the present invention can be prepared by means of a process which comprises the following steps, carried out successively:

(a) preparation of a chloroformyl-terminated oligomer, by reaction of phosgene and a dihydroxy-aromatic compound having the formula:

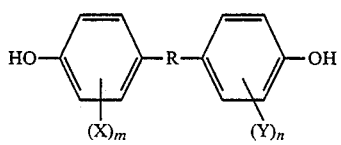
(II)

wherein:
R = an either substituted or non-substituted alkyl radical, containing from 0 to 5 C atoms, —O—, —S—, —SO$_2$—, —CO—;
X, Y are equal to, or different from, each other, and represent: H, CH$_3$, halogen;
m, n are integers, either equal to, or different from, each other, comprised within the range of from 1 to 4;

(b) condensation of the so-obtained oligomer with the polyfunctional comonomer of formula (I), wherein R, R$_1$, R$_2$, R$_3$ and Z have the above seen meaning;

(c) addition of a dihydroxy-aromatic compound (II) to the mixture obtained from (b), and polycondensation;

(d) recovery of the branched polycarbonate from the reaction mixture.

According to the present invention, the chloroformyl-terminated oligomers are prepared by means of the interface reaction between phosgene and a dihydroxy-aromatic compound (II) dissolved in an aqueous-alkaline solution, in the presence of an organic solvent immiscible with water, and of a molecular weight regulator, such as, e.g., p-tert.-butylphenol or p-isopropyl-phenol.

As the dihydroxy-aromatic compounds, for example, the following can be used:
4,4'-dihydroxy-biphenyl;
2,2-bis(4-hydroxy-phenyl)propane (Bisphenol A);
2,2-bis(3,5-dichloro-4-hydroxy-phenyl)propane;
bis(4-hydroxy-phenyl)methane;
2,2-bis(3,5-dimethyl-4-hydroxy-phenyl)propane.

Also bivalent compounds with one aromatic ring only, such as resorcinol or hydroquinone, can be used.

The reaction is carried out at a temperature comprised within the range of from 15° C. to 35° C., and preferably at room temperature (20°–25° C.).

The so-obtained oligomers have a molecular weight comprised within the range of from 400 to 2,000.

After the phase separation, to the organic phase containing the chloroformyl-terminated oligomers, the solution of the polyfunctional comonomer (I) in an organic solvent immiscible with water is added, with the amount of comonomer being such as to make it possible an end polycarbonate containing from 0.05 to 5 mol of comonomer per each 100 mol of aromatic dihydroxy-compound to be obtained.

Organic solvents immiscible with water are selected from those known from the prior art, and methylene chloride is preferably used.

Some examples of polyfunctional comonomers used are:
3,3',5,5'-tetrahydroxy-diphenyl-ether;
3,3',5,5'-tetrahydroxy-4,4-dimethyl-diphenyl-ether;
3,5-dihydroxy-phenyl-p-hydroxy-phenyl-methane;
3,5-dihydroxy-phenyl-(4'-hydroxy-3',5'-dimethyl)phenyl-methane.

Said comonomers can be easily obtained according to processes known in the art.

After the addition of the solution containing the comonomer (I), the reaction is continued by adding an aqueous-alkaline solution containing the aromatic dihydroxy-derivative to a reducing agent, preferably sodium dithionite, in order to prevent coloured by-products from forming, and then an aqueous solution is added, which contains the phase-transfer catalyst, e.g., a tertiary amine, preferably triethylamine.

The temperature at which the condensation is carried out ranges from 15° C. to 35° C., and is preferably kept at values around room temperature (20°–25° C.).

An aqueous-alkaline solution of sodium hydroxide at 20% by weight is then added.

After a time of from 2 to 3 hours, the so-obtained branched polycarbonate is isolated by washing the organic phase according to the methods known in the art, and distillation of the solvent, or precipitation with a non-solvent.

The preparation of such branched polycarbonates can be also carried out according to other processes, such as, e.g., the process according to which aromatic dihydroxy-derivatives, phosgene and the polyfunctional comonomer are condensed by means of an interface reaction, or in solution, by means of a single-step reaction.

Such polycarbonates can be also obtained by transesterification in the molten state, by reacting the dihydroxy-aromatic compound with diaryl-, dialkyl- or alkylaryl-carbonates at temperatures comprised within the range of from 100° to 300° C., in the presence of transesterification catalysts.

The branched polycarbonates of the present invention have a molecular weight comprised within the range of from 20,000 to 30,000, and are characterized in that they are completely soluble in the usual solvents for linear polycarbonate, and in that their melt-viscosity is strongly depending on the shear rate.

Such polycarbonates are therefore suitable for being processed both by the injection-moulding technique, typical for linear polycarbonates, and, e.g., by extrusion.

Owing to the excellent stability of their molten mass, such polycarbonates are particularly suitable for being fabricated by means of the blow-molding method, in order to produce hollow bodies.

The reactivity of the polyfunctional comonomer used as the branching agent is such that amounts comprised within the range of from 0.05 to 5 mol of such comonomer per each 100 mol of aromatic dihydroxy-compound are enough for reaching such a crosslinking degree, that the shear-sensitivity has always values higher than 15.

In order to characterize the branched polycarbonates according to the present invention, the following methods were used:

Intrinsic viscosity—Is determined in methylene chloride at 20° C. by means of the Ubbelhode viscometer, and is expressed as dl/g.

Shear sensitivity—The evaluation of this quantity is carried out by using the melt indexer, with loads of 2.16 and 21.6 kg at 260° C., according to ASTM D 1238.

Impact strength (IZOD)—Is evaluated on notched specimens at 0° C., according to ASTM D 256.

The following examples are illustrative, and non-limitative of the same invention.

EXAMPLE 1

Preparation of 3,3',5,5'-tetrahydroxy-diphenyl-ether

To a flask of 1 liter of capacity, 63.0 g (0.5 mol) of 1,3,5-trihydroxy-benzene (phloroglucinol) is charged together with 630 ml (3.45 mol) of aqueous hydrochloric acid at 20% by weight.

The solution, maintained under a nitrogen stream, and vigorously stirred, is heated up to boiling temperature and is then maintained at such a temperature for a 30-minute time.

During this time, the formation of a white precipitate is observed.

After the end of the heating, the reaction mixture is slowly cooled, until temperature returns back to room values (20°–25° C.).

The precipitate is recovered by filtration and is subsequently washed with water portions of 1.5 liters, until residual phloroglucinol and hydrochloric acid disappear (their disappearance is verified by means of thin-layer chromatography, and pH-meter).

After being washed, the precipitate is dried under vacuum and the crystalline product, obtained with a yield of 50%, gives the following data at elemental analysis:

C=60.4% (theoretical: 61.5%);
H=4.4% (theoretical: 4.3%).
Melting point: 290°–291° C.

The structure is furthermore confirmed by N.M.R. spectroscopic analysis and mass spectrometry.

EXAMPLE 2

Preparation of 3,5-dihydroxy-phenyl-p-hydroxy-phenyl-methane

To a reactor of 0.5 liters of capacity, maintained at the controlled temperature of 7° C. and maintained under a nitrogen stream, 88.0 g (0.8 mol) of 1,3-dihydroxybenzene (resorcinol) and 24.4 g (0.2 mol) of p-hydroxy-benzaldehyde dissolved in 150 ml of glacial acetic acid are charged.

To such solution, maintained under mechanical stirring and at a controlled temperature, a mixture is dropwise added over a 40-minute time, which is constituted by 40 ml of glacial acetic acid, and 20 ml (0.37 mol) of sulphuric acid at 36% by weight.

After 75 hours of reaction, the product is recovered by slow precipitation from ethyl ether (5 liters) and filtering over paper; the precipitate is then washed twice by being dispersed in ethyl ether (2 portions of 1 liter each) and filtered again.

After drying under vaccum, the raw product has a reddish colour, and the yield is of 95–96%.

13.5 g of such a raw product is dissolved in 270 ml of a water-acetone mixture=1/9 by volume, the solution is heated to boiling temperature, to it 27 g of zinc powder is added, and the whole mixture is maintained under refluxing conditions for 30 minutes.

The mixture is then filtered at high temperature, and is dropwise added to 2.7 liters of acetic acid/ethyl ether=1/9 by volume.

After dripping, the mixture is maintained at 0° C. for 20 hours.

The precipitate, still slightly coloured, is submitted again to a further purification as above disclosed.

At the end of the second purification treatment, a white powder having a melting point higher than 400° C. is obtained, with a yield of 60%.

The elemental analysis gives the following results:
C=71.3% (theoretical: 72.2%);
H=5.1% (theoretical: 5.5%).

The structure of the product is furthermore confirmed by N.M.R. spectroscopic analysis and mass spectrometry.

EXAMPLE 3

To a glass reactor of 3 liters of capacity, maintained at the controlled temperature of 25° C., under nitrogen 84 g of bisphenol A, 1.55 g of 3,3',5,5'-tetrahydroxy-diphenyl-ether (equivalent to 1.8 mol % relatively to bisphenol A), 65.2 g of sodium hydroxide dissolved in 650 ml of water, 20 mg of sodium dithionite (as a reducing agent) and 6.3 ml of a 0.5N aqueous solution of trimethylamine are charged.

2.7 g of p-tert.-butylphenol dissolved in 1,300 ml of methylene chloride is then added, and into the mixture, maintained with vigorous stirring, 44 g of phosgene gas is bubbled over 30 minutes. The reaction is let proceed for 2 hours, with aqueous sodium hydroxide at 20% by weight being added, in order to keep pH value higher than 11.

At the end, the reaction mixture is diluted with 500 ml of methylene chloride, and the organic phase is separated and washed, in the order, with 300 ml of water (twice), 800 ml of 0.15N aqueous sodium hydroxide (three times), 600 ml of water (twice), 600 ml of water (twice), 800 ml of 0.1N hydrochloric acid, and finally with portions of 600 ml of water until neutral.

At the end, the polymer is recovered by distilling off the organic solvent, is dried and ground until a powder is obtained.

The branched polycarbonate obtained shows the following characteristics:
Intrinsic viscosity=0.488 dl/g;
Shear sensitivity=19.8.
IZOD impact strength=706 J/m.

EXAMPLE 4

226 g of chloroformyl-terminated polycarbonate oligomers (number average molecular weight=722; chloroformyl end groups=2,611 meq/kg; hydroxy end groups=160 meq/kg), prepared from bisphenol-A, phosgene and p-tert.-butylphenol and dissolved in 900 ml of methylene chloride, is charged under nitrogen to a glass reactor of 2.5 liters of capacity, maintained at the controlled temperature of 25° C.

While the above solution is maintained with mechanical stirring by means of a double-anchor stirrer (300 rpm), to it a solution of 49.1 g of bisphenol A in 350 ml of $H_2O$, 21.5 g of sodium hydroxide, 31 mg of sodium dithionite, 4.08 g of 3,3',5,5'-tetrahydroxy-diphenylether (1.7 mol % relatively to total bisphenol A) and 5 ml of 0.05N aqueous solution of triethylamine are added in the same order as listed.

Subsequently, 92 ml of an aqueous solution of sodium hydroxide at 20% by weight is charged over 10 minutes, using a metering pump.

After 3 hours, the mixture is poured into 2,200 ml of methylene chloride; the organic phase is then separated and washed, in the order, with 450 ml of water (twice), 1,300 ml of 0.15N aqueous sodium hydroxide (three times), 900 ml of water (twice), 1,300 ml of 0.1N hydrochloric acid and, finally, with portions of 900 ml of water up to neutral pH.

The branched polycarbonate, isolated by means of the usual methodology, shows the following characteristics:

intrinsic viscosity = 0.456 dl/g;
shear sensitivity = 18.0.
IZOD impact strength = 702 J/m.

EXAMPLE 5

The process is carried out with the same operating modalities and reactant amounts as of Example 4, except for that 6.27 g of 3,3',5,5'-tetrahydroxy-diphenyl-ether (2.7 mol % relatively to total bisphenol A) is used.

The branched polycarbonate obtained has the following characteristics:

intrinsic viscosity = 0.507 dl/g.
shear sensitivity = 20.6.
IZOD impact resistance = 748 J/m.

I claim:

1. A blow moldable branched polycarbonate derived from (1) an aromatic dihydroxy-compound and a carbonate precursor and (2) at least one tri- or tetra-hydroxy biphenyl compound having the formula:

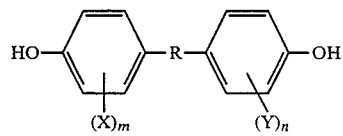

wherein:
Z represents O, —$CH_2$—;
R, $R_1$, $R_2$, are either the same or are different from, one another, and represent H, OH or $CH_3$, and at least one thereof is OH; and
$R_3$ represents H, $CH_3$.

2. A branched polycarbonate according to claim 1, wherein the tri- or tetra-hydroxy-biphenyl compound (I) is selected from:
3,3',5,5'-tetrahydroxy-diphenyl-ether;
3,3',5,5'-tetrahydroxy-4,4'-dimethyl-diphenyl-ether;
3,5-dihydroxy-phenyl-p-hydroxy-phenyl-methane;
3,5-dihydroxy-phenyl-(4'-hydroxy-3',5'-dimethyl-phenyl-methane.

3. A branched polycarbonate according to claim 1, wherein the tri- or tetra-hydroxy biphenyl compound is present in an amount of from 0.05 to 5 mol per each 100 mol of aromatic dihydroxy-compound.

* * * * *

UNITED STATES PATENT AND TRADEMARK OFFICE
CERTIFICATE OF CORRECTION

PATENT NO. : 4,900,803
DATED : February 13, 1990
INVENTOR(S) : Alberto Petri

It is certified that error appears in the above-identified patent and that said Letters Patent is hereby corrected as shown below:

Column 8, lines 1-8, the formula should appear as follows:

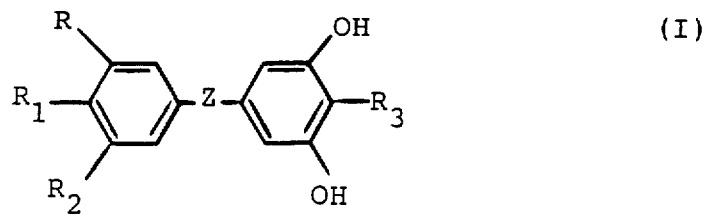

Signed and Sealed this

Second Day of June, 1992

Attest:

DOUGLAS B. COMER

Attesting Officer     Acting Commissioner of Patents and Trademarks